United States Patent
Laymon et al.

(10) Patent No.: US 6,357,384 B1
(45) Date of Patent: Mar. 19, 2002

(54) PIG DETECTOR

(76) Inventors: Dwane O. Laymon; James M. Berry; Stephen L. Skarke, all of P.O. Box 3489, Tulsa, OK (US) 74109-3489

( * ) Notice: Subject to any disclaimer, the term of this patent is extended or adjusted under 35 U.S.C. 154(b) by 0 days.

(21) Appl. No.: 09/528,855

(22) Filed: Mar. 20, 2000

(51) Int. Cl.[7] .............................................. G01P 13/00
(52) U.S. Cl. ........................ 116/281; 116/202; 116/204; 73/865.8; 200/61.41
(58) Field of Search ................................ 116/281, 282, 116/283, 204, 303, 203, 209, 230, 202; 73/865.8; 200/61.41

(56) References Cited

U.S. PATENT DOCUMENTS

| | | | | |
|---|---|---|---|---|
| 1,683,710 A | * | 9/1928 | Zitzman ..................... | 73/119 R |
| 2,667,631 A | * | 1/1954 | Schaurte ......................... | 377/6 |
| 2,698,363 A | | 12/1954 | Rush ........................ | 200/61.41 |
| 3,109,410 A | | 11/1963 | Ver Nooy .................... | 116/303 |
| 3,280,629 A | * | 10/1966 | Kliewer ...................... | 116/218 |
| 3,306,251 A | * | 2/1967 | Suttie ......................... | 116/215 |
| 3,327,677 A | | 6/1967 | King ............................ | 116/303 |
| 4,168,413 A | * | 9/1979 | Halpine .................... | 200/82 E |
| 4,481,806 A | * | 11/1984 | Schud ......................... | 73/1.22 |
| 4,491,018 A | | 1/1985 | Stringer et al. ............ | 73/865.8 |
| 4,596,204 A | | 6/1986 | Ralls ........................... | 116/303 |
| 4,658,646 A | | 4/1987 | Bell et al. ................... | 73/865.8 |
| 5,263,220 A | * | 11/1993 | Campbell ............... | 15/104.063 |
| 5,279,251 A | | 1/1994 | Bierman ..................... | 116/204 |
| 5,417,122 A | | 5/1995 | Casey et al. ........... | 73/864.444 |
| 5,506,505 A | | 4/1996 | Worthen et al. ............ | 324/326 |

* cited by examiner

Primary Examiner—Diego Gutierrez
Assistant Examiner—R. Alexander Smith
(74) Attorney, Agent, or Firm—William S. Dorman (57) ABSTRACT

A device for indicating the passage of a pig beyond a predetermined location in a pipeline comprising a pig detector connected to a pipeline and communicating with the interior of the pipeline through an opening at the location, a trigger slidably mounted in the pig detector and adapted to project downwardly into the interior of the pipeline through the opening, an indicator housing associated with the pig detector, a cylindrical indicator being vertically slidably mounted within the indicator housing, a plurality of catch fingers pivotally mounted in the housing for pivotal movement toward and away from the central axis of the housing, a catch spring for urging the fingers pivotally towards the central axis, an indicator spring mounted within the housing for resiliently urging the indicator upwardly beyond the indicator housing so as to be visible and to provide an indication that a pig has passed by, a lock pin attached to the lower surface of the indicator, an actuator connected to the trigger and having a portion bearing against the fingers, whereby, when the indicator is pushed downwardly, the lock pin will pry the catch fingers apart and thereafter the catch fingers will engage the lock pin to hold the indicator in a downward position within the indicator housing, whereby, when a pig moves in the pipeline past the trigger and actuates the trigger, the actuator will bear against the fingers and separate them radially against the action of the catch spring to release the lock pin and allow the indicator to move upwardly beyond the indicator housing so as to provide a visual indication that a pig has passed by.

6 Claims, 8 Drawing Sheets

Fig. 12

PIG DETECTOR

BACKGROUND OF THE INVENTION

1. Field of the Invention

The present invention relates generally to devices for determining the position of a pipeline pig in a pipeline. More particularly, the present invention involves an apparatus for signaling the passage of a pipeline pig beyond a predetermined point or points in the pipeline.

2. Prior Art

The prior art is replete with devices responsive to the position of a pipeline pig in a pipeline. However, the present invention involves a device which has an indicator which moves to a visible position when actuated by a passing pig. In one modification, the indicator is lighted.

A patentability search was conducted and the following references were uncovered in the search.

| Patent No. | Inventor | Dated |
| --- | --- | --- |
| 2,698,363 | Rush | Dec. 28, 1954 |
| 3,109,410 | VerNooy | Nov. 5, 1963 |
| 3,327,677 | King | June 16, 1966 |
| 4,491,018 | Stringer et al. | Jan. 1, 1985 |
| 4,596,204 | Ralls | Jun. 24, 1986 |
| 4,658,646 | Bell et al. | Apr. 21, 1987 |
| 5,279,251 | Bierman | Jan. 18, 1994 |
| 5,417,122 | Rosenberg | May 23, 1995 |
| 5,506,505 | Worthen et al. | Apr. 9, 1996 |

Bierman U.S. Pat. No. 5,279,251 discloses a signaling device for indicating passage of a pig, and which uses a spring biased plunger and a colored visual indicating means.

Figure 4:
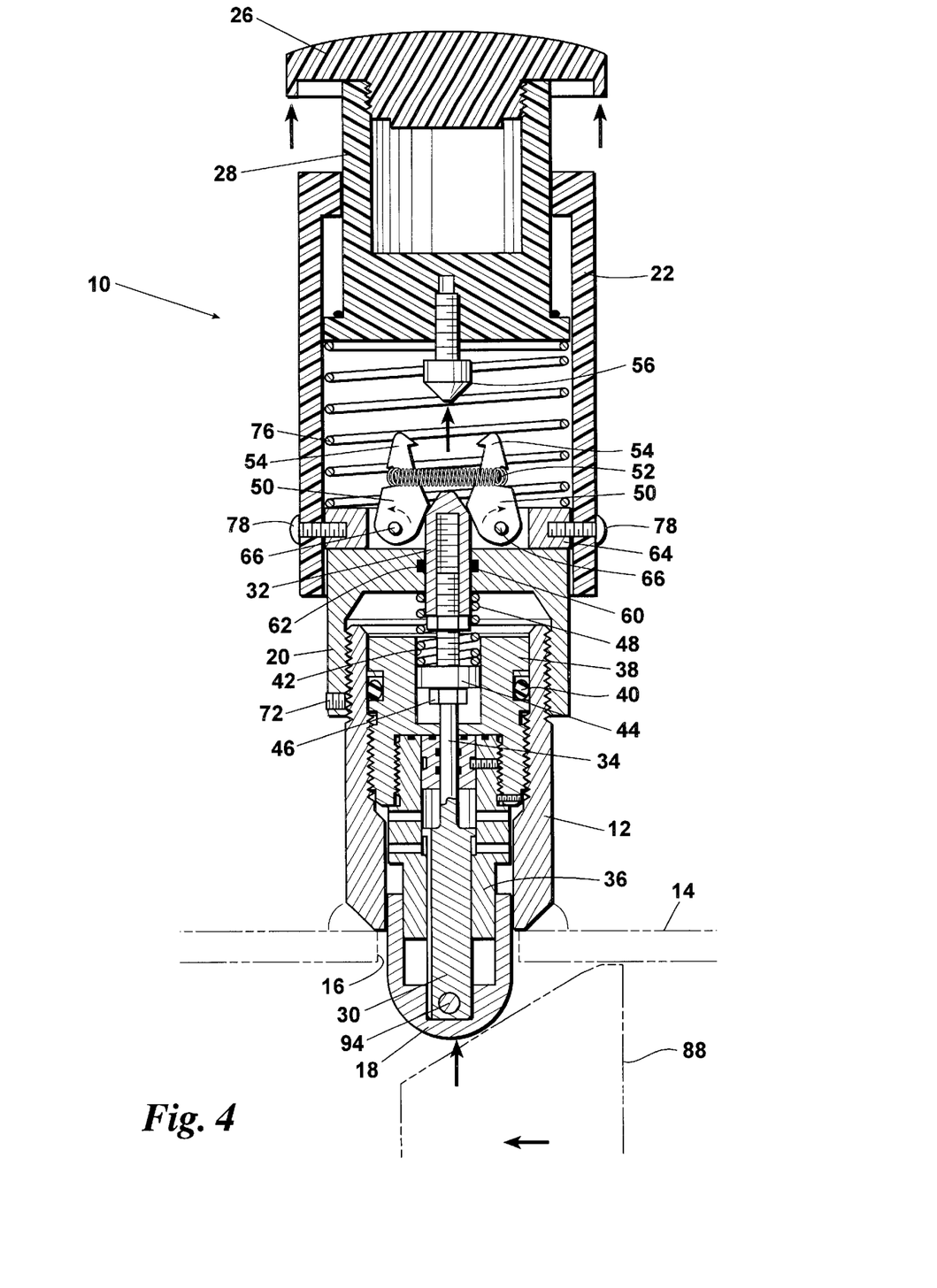
FIG. 4 is a view similar to FIG. 3 but showing the trigger being released by a pig.
Figure 5:
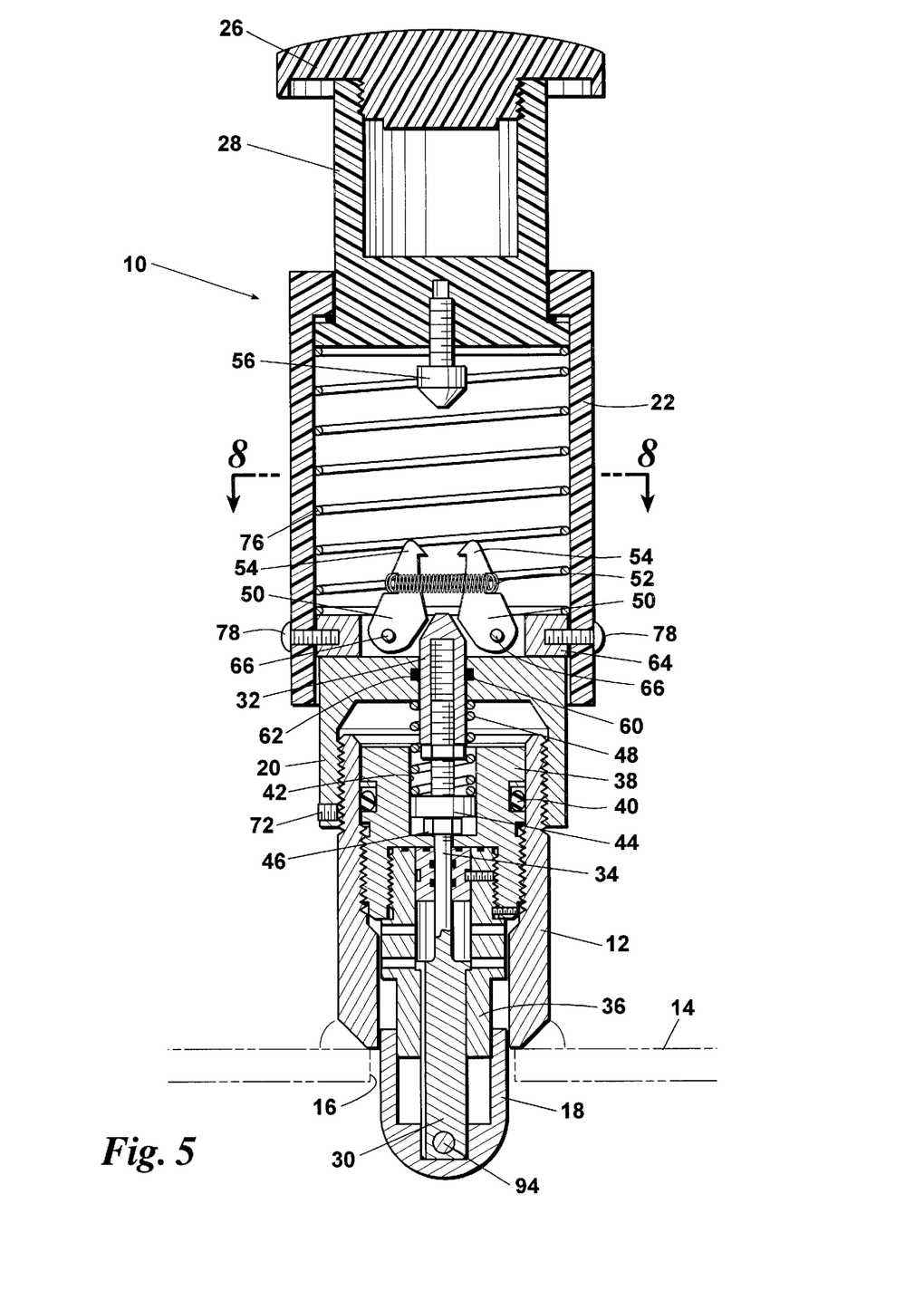
FIG. 5 is a longitudinal sectional view taken along section line 5—5 at a time slightly after the position shown in FIG. 4.

Ver Nooy U.S. Pat. No. 3,109,410 discloses a passage indicator for pipeline scrapers which uses a rotatable visual indicator as shown in FIGS. 4 and 5.

Ralls U.S. Pat. No. 4,596,204 discloses an apparatus for signaling the passage of a pig through a pipeline. When the pig passes, a flag pops up.

The remaining references to do not appear to be of any pertinence.

SUMMARY OF THE INVENTION

The present invention relates to a pig detector which is adapted to be mounted on the outside of a pipeline for the purpose of determining the passage of a pig past the point of attachment. The pig detector includes a pipe nipple connected to the pipeline and communicating with the interior of the pipeline through an opening. A trigger ball projects downwardly from the pipe nipple through the opening and into the interior of the pipeline and adapted to be contacted by a passing pig. The pipe nipple connects with an indicator housing in which a cylindrical indicator is vertically slidably mounted. Within the housing are mounted a plurality of catch fingers which are pivotal towards and away from the central axis of the housing and which are provided with catches. The trigger connects with an actuator which is positioned to bear against the sides of the catch finger to cause them to pivot outwardly away from each other when the actuator moves up vertically. The catch fingers are provided with a garter spring to urge them radially inwardly towards the central axis. The actuator is resiliently urged downwardly by an actuator spring so as to cause the trigger to protrude into the space in the pipeline. An indicator spring is mounted within the housing to resiliently urge the indicator upwardly beyond the indicator housing so as to be visible and to provide indication that a pig has passed by. A lock pin is attached to the lower surface of the indicator and is provided with a pointed end which is adapted, when moved downwardly, to pry the catch fingers apart and also the lock pin is provided with an upper surface adapted to be engaged by the catches on the catch fingers to hold the indicator totally within the housing against the action of the second spring. When a pig moves in the pipeline past the trigger and actuates the trigger, the actuator will bear against the fingers and separate them radially against the action of the garter spring to release the lock pin and allow the indicator to move upwardly within the indicator housing so as to provide a visual indication that a pig has passed. In a modified form of this invention, the indicator is provided with a battery, a strobe light and a contact strip which connects the battery with the strobe light through a reed switch. A magnet is mounted in the upper rim of the indicator housing. The indicator in the modified form of the invention is longer than the indicator shown in the prior figures, and furthermore, is translucent. When the trigger is actuated by the passage of a pig, the indicator proceeds to move upwardly as was the case with the prior embodiment. However, when the reed switch passes by the magnet, the strobe light will turn on. Thus, the indicator will not only be visible, but it will also be visible at night.

DETAILED DESCRIPTION OF THE PREFERRED EMBODIMENTS

Figure 1:
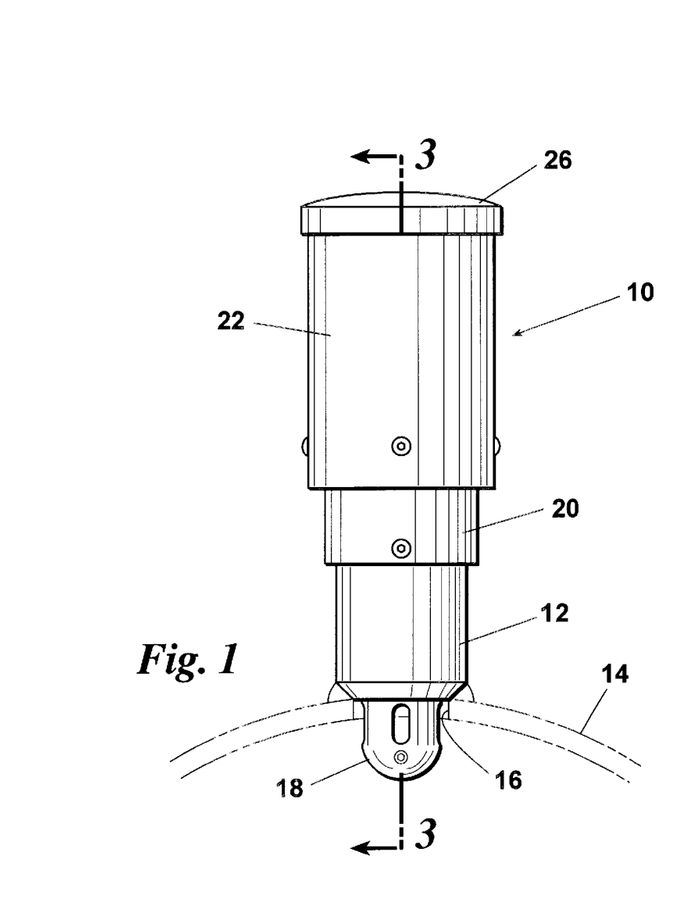
FIG. 1 is an elevation of the pig detector of the present invention showing the trigger element projecting inwardly into the pipeline.
Figure 2:
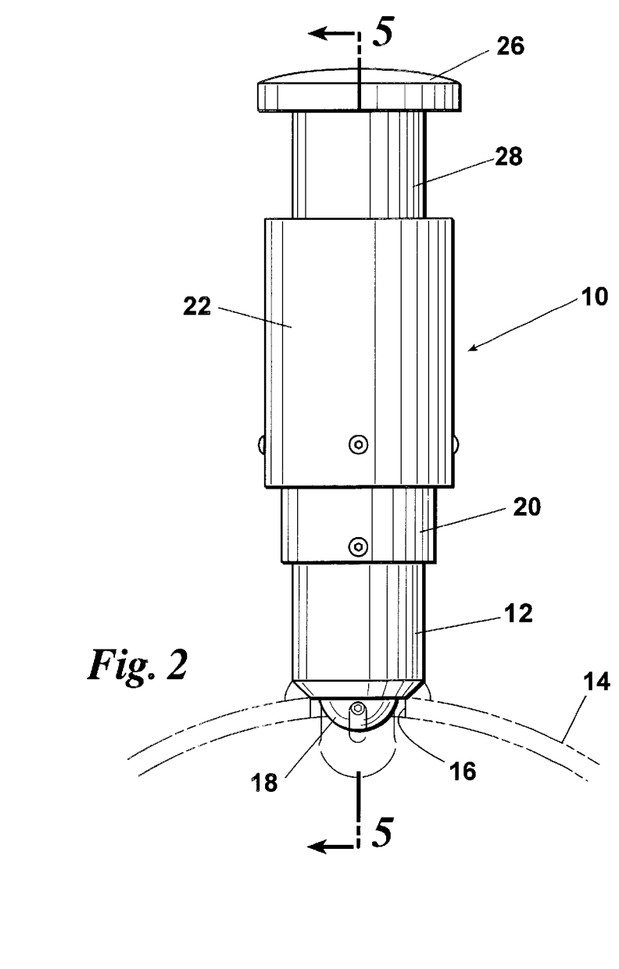
FIG. 2 is a view similar to FIG. 1 but showing the trigger element in its upmost position, with the indicator also being elevated.

Referring to the drawings in detail, FIGS. 1 and 2 show a pig detector 10 comprised of a pipe nipple 12 which can be connected to the outside of a pipe 14 in any conventional manner, for example, by welding. The pipe 14 will have a hole 16 therein through which a ball (trigger) 18 protrudes. The ball 18 is connected to the internal components of the pig detector 10 in a manner later to be described. The exterior of the pig detector 10 also shows a collar 20, an indicator housing 22 and a cap 26.

In the position shown in FIG. 1, the ball 18 is in its lowermost position, indicating that a pig has not passed the location of the pig detector 10 so that the trigger ball is not pushed upwardly. However, in the position shown in FIG. 2, the trigger ball 18 is disposed upwardly indicating that a pig has just passed by, such that the internal mechanism has been actuated to release a cylinder 28 which is also referred to as an indicator. In FIG. 2, the indicator 28 merely indicates that a pig has passed by, and it can be very easily distinguished from the appearance of the pig detector in FIG. 1.

Figure 3:
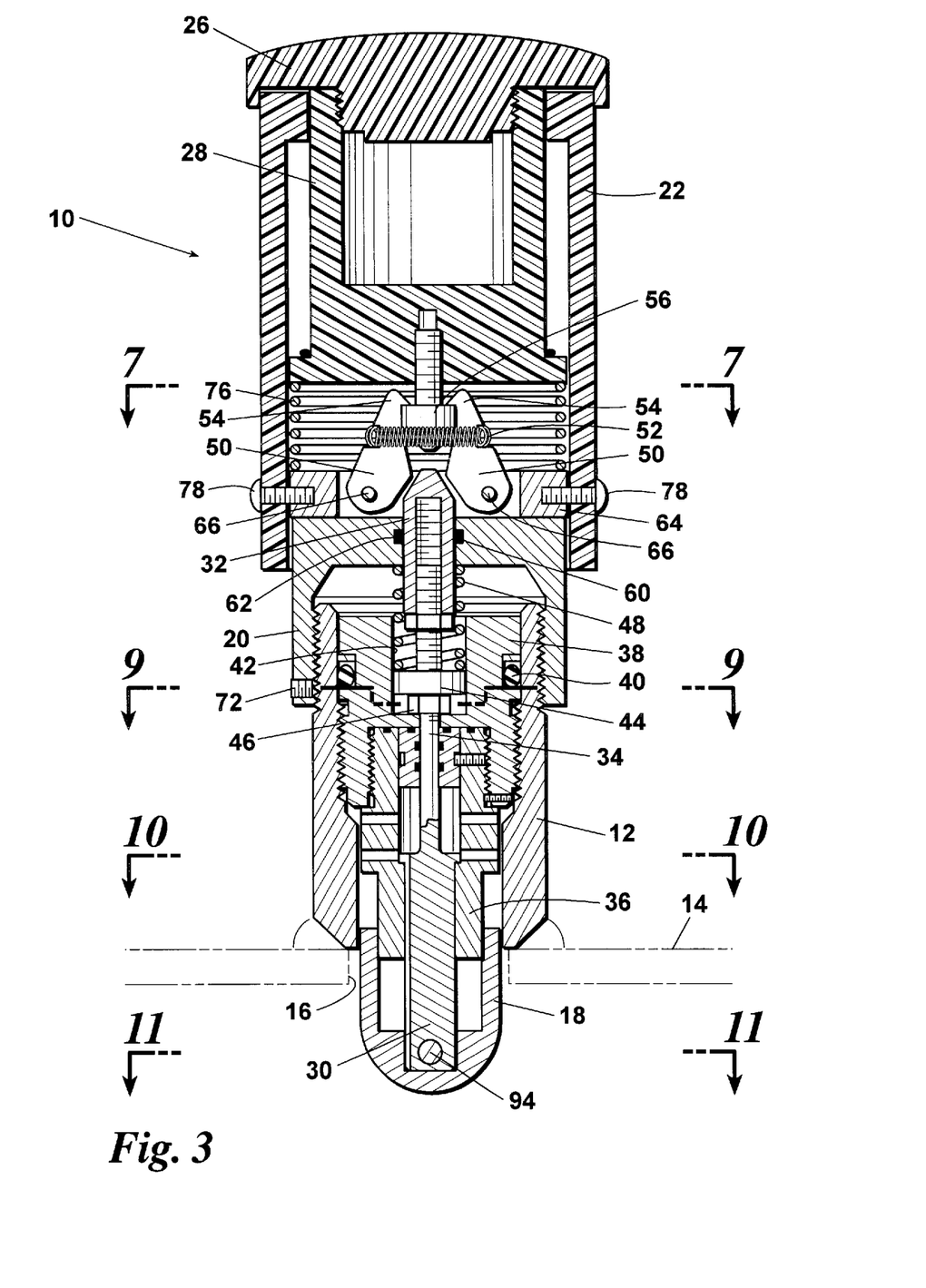
FIG. 3 is a longitudinal sectional view taken along section line 3—3 of FIG. 1.

Referring now to FIG. 3, which is a longitudinal cross-section through the pig detector and the pipe 14, the trigger ball 18 is connected to the lower end of a plunger 30 which connects with an actuator 32 through a stem 34. The plunger 30 is adapted to be slidably received within a housing which has a lower end 36 and upper end 38. The plunger 30, the actuator 32, and the interconnecting stem 34 are all slidably received in the upper and lower housings which are interconnected by various threaded means shown in the drawing. The various elements in the drawing located below housing 38 are all variously lubricated and an O-ring 40 is provided. The upper end of the upper housing 38 is provided with a cylindrical recess 42 in which a flange 44 is received. The flange 44 is actually the lower end of an actuator screw 80 whose upper end is reduced in diameter in respect to the flange 44 and also is adapted to be received in a threaded hole in the actuator 32. An adjustment nut 82 is received on the upper end of the screw 80 below the actuator 32.

An O-ring 40 is mounted in a suitable peripheral groove in the housing 38 and a backup O-ring 84 is also mounted in this same groove immediately above the O-ring 40. A wiper element 86 can be positioned within the housing 38 so as to contact the upper stem portion 34 of the plunger 30 to keep the lubrication in proper order. A retention nut 46 is threadably received on the stem 34 below the flange 44. A helical spring 48 is received over the lower end of the actuator 32 and extends within the recess 42 downwardly from the lower inside surface of the collar 20 to the upper surface of the flange 44 for continually urging the plunger stem 34 and actuator 32 downwardly so that the ball 18 is also urged downwardly.

Above the top of the actuator 32 there is mounted a plurality of catch fingers 50 which are urged towards each other by means of a garter spring 52. The tops of the fingers 50 are provided with catches 54 which are adapted to be received over the top of a pointed lock pin 56 which is threadedly received in the lower end of a cylindrical indicator 28. The indicator 28 is slidably received within an indicator housing 22.

Figure 6:
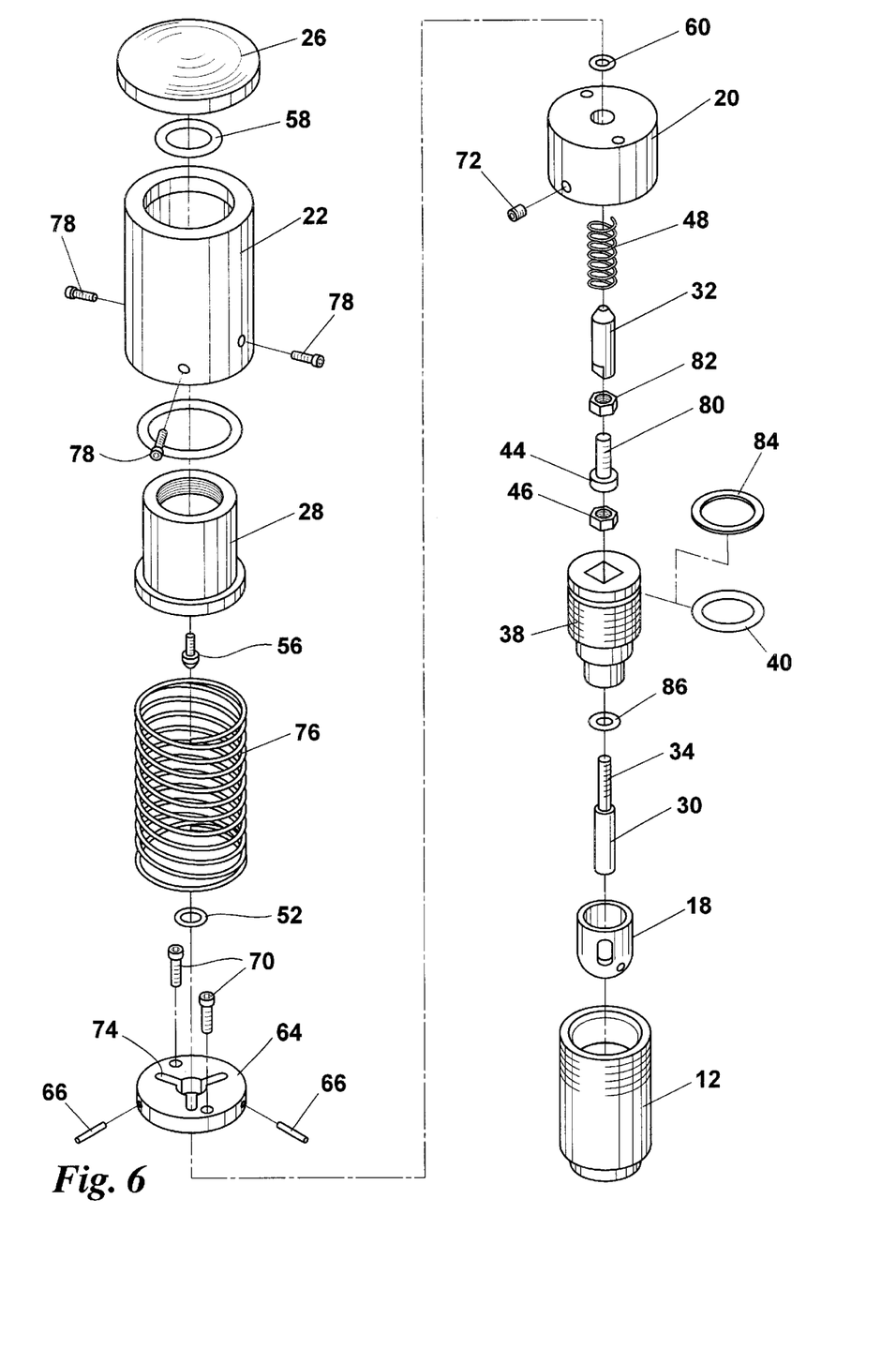
FIG. 6 is an exploded view of the elements shown in FIGS. 1 through 5 but with the catch fingers omitted.

Whereas, most the elements of the pig detector have been shown and described in relation to FIGS. 1 to 3, FIG. 6, nevertheless, is an exploded view which shows the manner in which the various elements interconnect with each other as previously described in relation to FIGS. 1–3; FIG. 6 also illustrates additional elements not specifically shown in FIGS. 1 to 3.

Immediately below the cap 26, there is shown an O-ring 58 which is adapted to be received between the lower end of the cap 26 and the upper threaded end of the indicator 28. Immediately above the collar 20 there is shown an O-ring 60 which is adapted to be received in a recess 62 located in the upper portion of the collar 20, more particularly centrally in the bore which is provided for the actuator 32. A catch plate 64 is provided for the catch fingers 50 (not shown in this figure). Catch finger pins 66 (three in number) are provided to permit pivoting of the fingers 50 (not shown) in radial slots 74.

Referring also to FIG. 3, in addition to FIG. 6, the upper end of the pointed lock pin 56 is threadedly received in a threaded opening at the bottom of the indicator 28. Thus, when the lock pin 56 is engaged by the fingers 50, as shown in FIG. 3, the indicator 28 is fully enclosed within the indicator housing 22 and an indicator spring 76 is compressed between the lower end of the indicator 28 and the catch plate 64. Four button-head screws 78 pass through suitable holes in the indicator housing 22 and into the sides of the catch plate 64. The catch plate 64, in turn, is provided with a pair of button-head screws 70 which pass through suitable holes in the catch plate 64 and into holes in the collar 20 to hold them in a fixed position. The collar 20, in turn, is provided with a brass tipped set screw 72 which secures the collar 20 onto the upper threaded end of the pipe nipple 12.

Turning now to FIG. 4, when a pig 88 passes through the pipeline 14 and actuates the trigger 18, the actuator 32 will move upwardly and engage the sides of the three catch fingers 50 causing them to pivot outwardly and release the lock pin 56. At this time, the spring 76 commences to raise the indicator 28. FIG. 5 represents the condition of the pig detector 10 after the pig 88 has passes completely by. In the FIG. 5 position the spring 76 has raised the indicator 28 to its uppermost position so that it serves as a signal to anyone looking that way that the pig has passed this particular pig detector. At the same time, the spring 48 moves the trigger 18 back to its original position and the garter spring 52 will move the fingers 50 back to their original position. If it is desired to recock the pig detector, all one needs to do is push downwardly on the cap 26 until the lock pin 56 is engaged by the catches 54 at the tops of the catch fingers 50.

Figure 7:
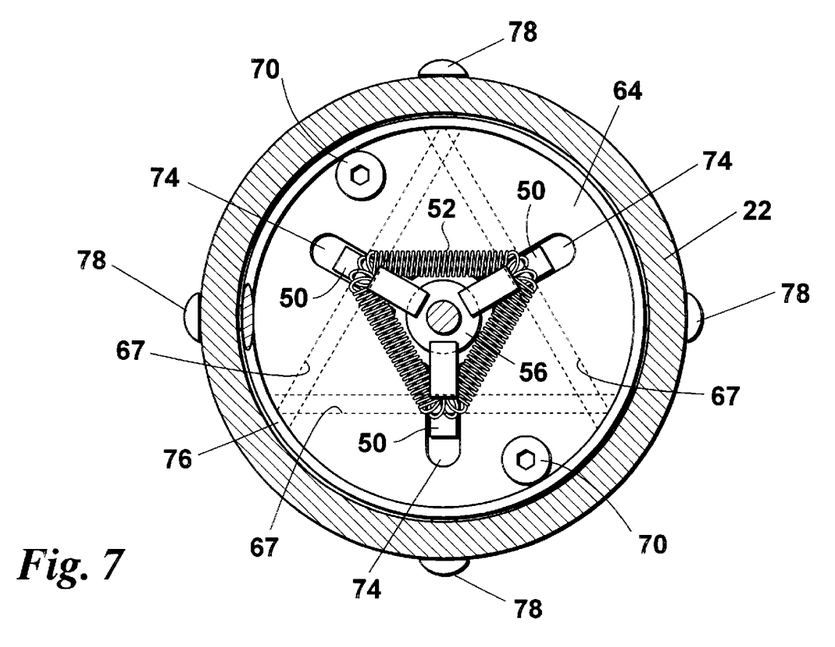
FIG. 7 is a transverse sectional view taken along section line 7—7 of FIG. 3.
Figure 8:
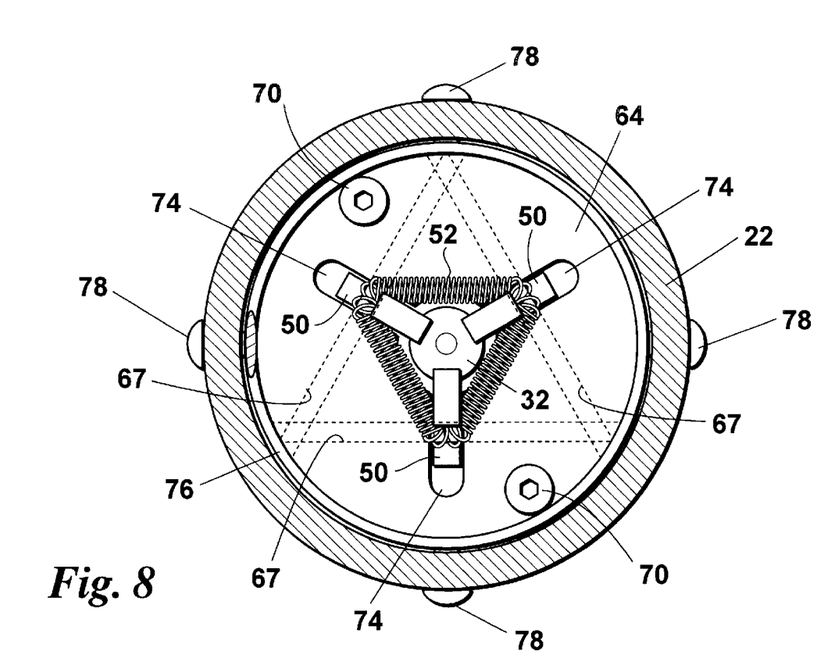
FIG. 8 is a transverse sectional view taken along section line 8—8 of FIG. 5, after the catch fingers have been returned to their original position by the garter spring.

FIGS. 7 and 8 relate to enlarged details of the catch finger assembly. FIG. 7 is a sectional view taken along section line 7—7 of FIG. 3, showing the catch fingers 50 in engagement with the lock pin 56. Note that the fingers 50 are urged pivotally inwardly towards each other by means of the garter spring 52 which encircles the fingers midway of their ends. FIG. 8 is a sectional view taken along section line 8—8 of FIG. 5 after the lock pin 56 has been released. The garter spring 52 has returned the fingers 50 to their original position as shown in FIG. 5 and the actuator 32 is bearing against the lower sides of the fingers. FIGS. 7 and 8 also show three triangularly arranged holes or bores 67 which extend like chords across the catch plate 64 so as to receive therein the catch finger pins 66 which permit, the pivoting of the fingers 50 in the radial slots 74.

Figure 9:
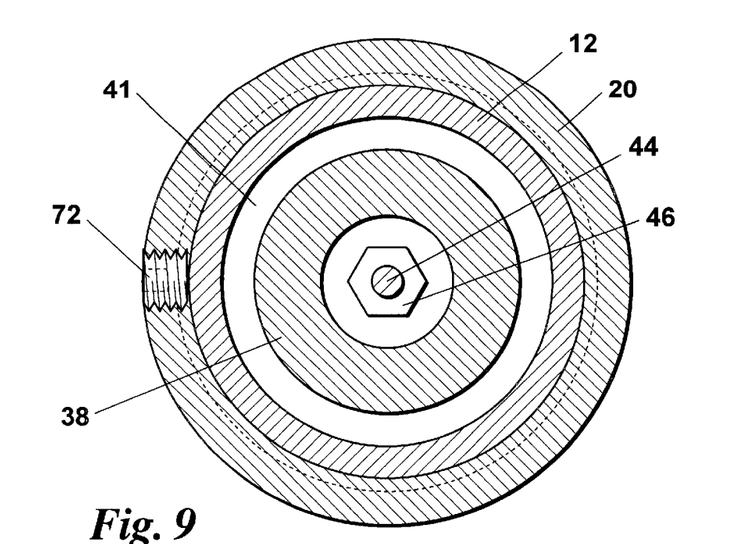
FIG. 9 is a transverse sectional view taken along section line 9—9 of FIG. 3.

FIG. 9 is a transverse sectional view taken along section line 9—9 of FIG. 3 and cuts through the collar 20 roughly in the neighborhood of the set screw 72. Housing 38 is shown separated from the pipe 12 by means of an annular space 41 which represents the recess in which the O-ring 40 and 84 are located.

Figures 10, 11:
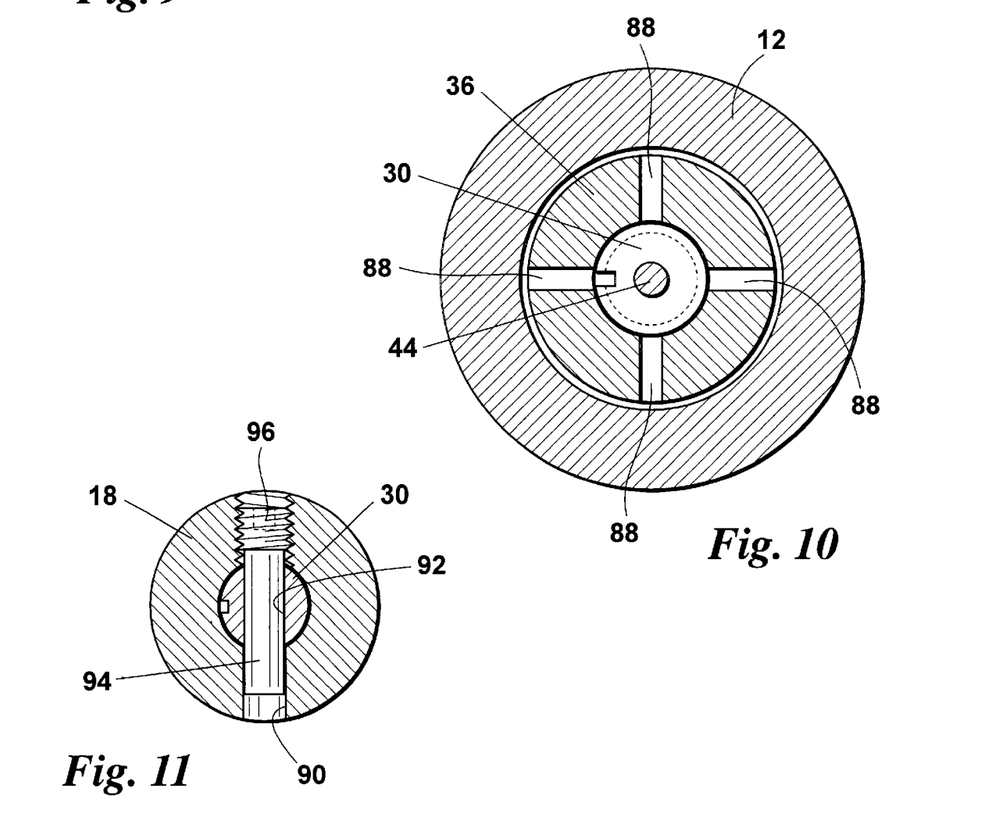
FIG. 10 is a transverse sectional view taken along section line 10—10 of FIG. 3.
FIG. 11 is a transverse sectional view taken along section line 11—11 of FIG. 3.

FIG. 10 is a sectional view taken near the bottom of the pipe 12 as shown by the section line 10—10 of FIG. 3. This sectional view also includes a section of the lower housing 36 and the stem 44. The lower housing 36 is provided with four radial holes 88 which serve to equalize pressure and assist in distributing lubrication.

FIG. 11 is a sectional view of the bottom end of the trigger 18 showing its attachment to the plunger 30. The trigger 18 is provided with a transverse opening 90 which is in alignment with a transverse opening 92 in the plunger 30. A pin 94 having a set screw 96 at one end thereof is adapted to pass through the opening 90 in the trigger 18 and also through the hole 92 in the plunger 30 to hold the trigger 18 in place.

Figure 12:
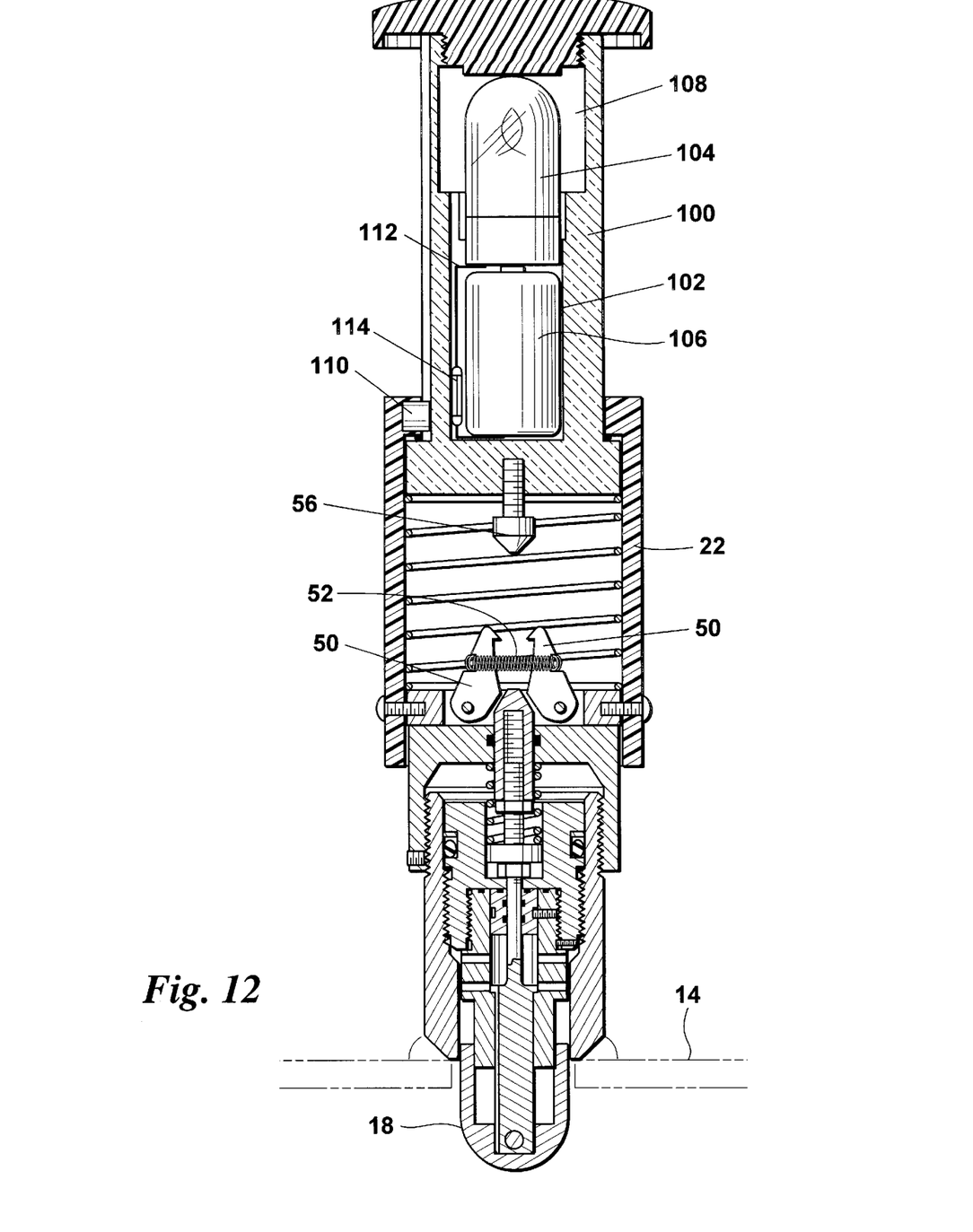
FIG. 12 is a longitudinal sectional view similar to FIG. 5 of a modified form of the invention and including a lighted indicator.

FIG. 12 is a longitudinal sectional view similar to FIG. 5 of an additional embodiment of the present invention. FIG. 5 shows the indicator cylinder 100 as a cylinder which is somewhat lengthened as compared to the indicator cylinder 28. The indicator cylinder 100 is also translucent for a reason which will hereinafter appear.

The indicator 100 is provided with a central bore or recess 102 for receiving therein a strobe light 104 and a battery 106. The strobe light 104 projects upwardly into an open space 108 above the cylindrical recess 102. A magnet 110 is mounted in the upper rim of the indicator housing 22. A contact strip 112 connects with one electrode of the strobe light 104 and this contact strip extends downwardly to a reed switch 114. The lower end of the contact strip 112 is tucked under the edge of the battery 106 the other electrode of the battery bears against the second electrode of the strobe light 104 essentially in the bottom center of the strobe light. When the elements shown in FIG. 12 are such that the indicator cylinder 100 is in its lowermost position, the lock pin 56 will be engaged by the catch fingers 50 and the entire indicator housing 100 will be received within the indicator housing 22. The reed switch 114 will be out of the influence of the magnet 110 and will be open so that the strobe light 104 is off. When, however, a pig such as pig 88 passes by the trigger 18 and causes the lock pin 56 to be released, the cylindrical indicator 100 will move upwardly; as the reed switch 114 passes the magnet 110, the contacts in the reed switch will be closed and the strobe light will go on intermittently for whatever frequency the light is designed.

What is claimed is:

1. A device for indicating the passage of a pig beyond a predetermined location in a pipeline comprising a pig detector for connecting to a pipeline and communicating with the interior of the pipeline through an opening at said location, a trigger slidably mounted in the pig detector and adapted to project downwardly into the interior of the pipeline through the opening, an indicator housing associated with the pig detector, a cylindrical indicator being vertically slidably mounted within the indicator housing, a plurality of catch fingers pivotally mounted in the housing for pivotal movement towards and away from the central axis of the housing, means for urging the fingers pivotally towards the central axis, an indicator spring mounted within the housing for resiliently urging the indicator upwardly beyond the indicator housing so as to be visible and to provide an indication that a pig has passed by, a lock pin attached to the lower surface of the indicator, an actuator connected to the trigger and having a portion bearing against the fingers, whereby, when the indicator is pushed downwardly, the lock pin will pry the catch fingers apart and thereafter the catch fingers will engage the lock pin to hold the indicator in a downward position within the indicator housing, whereby, when a pig moves in the pipeline past the trigger and actuates the trigger, the actuator will bear against the fingers and separate them radially against the action of the urging means to release the lock pin and allow the indicator to move upwardly beyond the indicator housing so as to provide a visual indication that a pig has passed by.

2. A pig detector as set forth in claim 1 wherein the indicator is translucent, the indicator being provided with a cavity in which is received a battery, a strobe light and a contact strip which connects the battery with the strobe light through a reed switch, a magnet mounted adjacent an upper end of the housing, whereby, when the trigger is actuated by the passage of a pig, the indicator proceeds to move upwardly within the indicator housing until the reed switch passes by the magnet at which time the strobe light will be turned on so as to provide an indication that can be perceived at night.

3. A pig detector as set forth in claim 1 wherein a plunger extends from the trigger to the actuator, a collar through which the actuator extends, an actuator spring extending from the bottom of the collar to a washer on the actuator to urge the trigger downwardly into the pipeline.

4. A pig detector comprising a pipe nipple for connecting to a pipeline and communicating with the interior of the pipeline through an opening, a trigger ball slidably mounted in the pipe nipple and adapted to project downwardly from the pipe nipple through the opening and into the interior of the pipeline, an indicator housing connected to the pipe nipple, a cylindrical indicator being vertically sidably mounted within the indicator housing, a catch plate mounted in the housing below the indicator, a plurality of catch fingers pivotally mounted in the catch plate for pivotal movement towards and away from the central axis of the housing, a garter spring surrounding the fingers to urge them towards the central axis, an indicator spring mounted within the housing between the indicator and the catch plate for resiliently urging the indicator upwardly beyond the indicator housing so as to be visible and to provide an indication that a pig has passed by, a lock pin attached to the lower surface of the indicator, the lock pin having a lower pointed end and an upper surface for engaging the catch fingers, an actuator connected to the trigger and having a portion bearing against the fingers, whereby, when the indicator is pushed downwardly, the lock pin will pry the catch fingers apart and thereafter the catch fingers will engage with the upper surface of the lock pin to hold the indicator in a downward position within the indicator housing, whereby, when a pig moves in the pipeline past the trigger and actuates the trigger, the actuator will bear against the fingers and separate them radially against the action of the garter spring to release the lock pin and allow the indicator to move upwardly beyond the indicator housing so as to provide a visual indication that a pig has passed by.

5. A pig detector as set forth in claim 4 wherein the indicator is translucent, the indicator being provided with a cavity in which is received a battery, a strobe light and a contact strip which connects the battery with the strobe light through a reed switch, a magnet mounted adjacent an upper end of the housing, whereby, when the trigger is actuated by the passage of a pig, the indicator proceeds to move upwardly within the indicator housing until the reed switch passes by the magnet at which time the strobe light will be turned on so as to provide an indication that can be perceived at night.

6. A pig detector as set forth in claim 4 wherein a plunger extends from the trigger to the actuator, a collar through which the actuator extends, an actuator spring extending from the bottom of the collar to a washer on the actuator to urge the trigger downwardly into the pipeline.

* * * * *